E. LARSSON.
VEHICLE COUPLING.
APPLICATION FILED JAN. 21, 1922.

1,430,659.

Patented Oct. 3, 1922.

Inventor
Ernst Larsson.

Witness
H. J. Stromberger.

By

Attorney

Patented Oct. 3, 1922.

1,430,659

UNITED STATES PATENT OFFICE.

ERNST LARSSON, OF MANSFIELD, OHIO, ASSIGNOR TO THE OHIO BRASS COMPANY, OF MANSFIELD, OHIO, A CORPORATION OF NEW JERSEY.

VEHICLE COUPLING.

Application filed January 21, 1922. Serial No. 530,821.

*To all whom it may concern:*

Be it known that I, ERNST LARSSON, a citizen of the United States of America, residing at Mansfield, in the county of Richland and State of Ohio, have invented certain new and useful Improvements in Vehicle Couplings, of which the following is a specification.

My invention relates to coupling devices for vehicles and more particularly to means for preventing the interlocking of couplers at will.

My invention, which performs the function of an anti-coupling device, resides in the novel features of construction, combination and relation of the various parts to be hereinafter more fully described and claimed and shown in the accompanying drawings and in which:—

Figure 1:
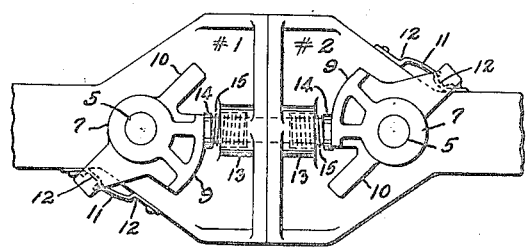
Fig. 1 is a top plan view of my invention applied to couplers in coupled relation.

It is sometimes desirable to be able to bump cars together without the couplers interlocking and this is quite advantageous about coal mines and my invention herein described and shown will prevent the coupling of cars when desired and my preferred form is shown as attached to a hook type of coupler head but is applicable to other types.

As applied to the hook type of coupler I employ a head 1 provided with a coupling face 2. Projecting from the face 2 is a coupling hook 3 provided with a face 4 to engage a like face on the hook of a counterpart head. The hook 3 is pivotally secured to the head 1 by a pin 5. Pivotally secured to the pin 5 is a yoke member 6 comprising the parallel members 7 and the connecting bar 8. The members 7 are provided with means to receive the pin 5 and a cam face 9 in which the distance A is greater than the distance B from the center of rotation. The upper member 7 is provided with a handle 10 by means of which the yoke member 6 is rotated. Secured to the head 1 is a spring latch 11 provided with notches 12 which engage the bar 8 at both ends of its travel when the member 6 is rotated to hold the member 6 in either extreme position.

Figure 2:
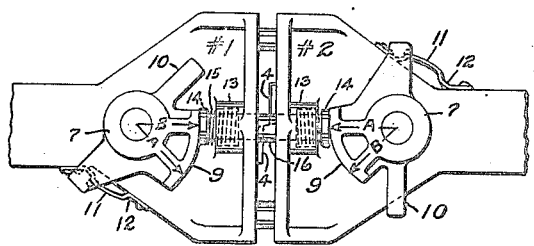
Fig. 2 is a similar view to Fig. 1 with my invention in a different relation to the coupler preventing the interlocking of the coupler heads.
Figure 3:
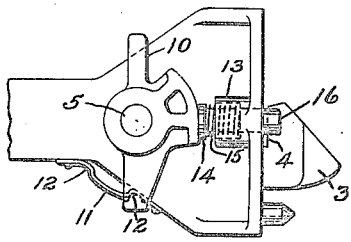
Fig. 3 is a top plan view of one of the heads shown in Figs. 1 and 2 with the anti-coupling device thrown into operative position as shown in coupler head No. 2, of Fig. 2.
Figure 4:
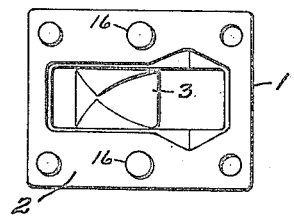
Fig. 4 is a face view of Fig. 3.
Figure 5:
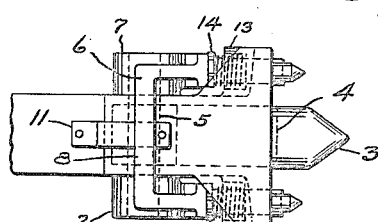
Fig. 5 is a side view of Fig. 3 showing the anti-coupling attachment in operative position.

Mounted on the head is a member 13 provided with a longitudinal passage to receive the pin 14 and the spring 15. The length of the pin 14 is such that the face 16 of the pin 14 will be flush with the face 2 of the head when the member 6 is in the position shown in head #1 of Fig. 2 and the face 16 will project beyond the face 2 of the head and the face 4 of the hook when the member 6 is in the position shown in head #2 of Fig. 2. The spring 15 tends to retract the pin when the member 6 is in the position shown in head #1 of Fig. 2. When the yoke members 6 are in the position shown on head #1 of Fig. 2 the heads may be brought together with the faces 2 contacting and the hooks 3 will interlock and the vehicles will be coupled as shown in Fig. 1. When the yoke members 6 (one or both) are in the position shown on head #2 of Fig. 2, the pin or pins will be projected and prevent the faces 2 from contacting or the faces 4 of the hooks 3 from interlocking as shown in Fig. 2 and under such conditions the vehicles may be bumped together without the couplers coupling.

It is of advantage to have the pins projecting from the two points, above and below the horizontal center of the heads, the couplers will not be stressed when bumped together as would be the case if only one pin was used above or below, although my invention is operative if only one bumping pin is used. It is quite obvious that the specific construction shown and described herein is subject to modifications which will be evident to one skilled in the art, but I do not wish to be limited other than by my claims as follows:—

I claim:

1. The combination with a car coupler provided with a body member and projecting means to interlock with projecting means on a counterpart coupler for the purpose of connecting the couplers, of cam operated means to prevent, at will, the interlocking of the projecting means and the connecting of the couplers.

2. The combination with a car coupler provided with a body member and means to interlock with means on a counterpart coupler for the purpose of connecting the couplers, of means projecting from the face of one of the couplers to prevent, at will, the interlocking of the said means on the couplers and the connecting of the couplers.

3. The combination with a pair of counterpart car couplers provided with means to inter-couple of projectable means on one coupler to engage like means on the other coupler to prevent connecting the couplers at will.

4. The combination with a pair of counterpart car couplers of means on each coupler operable to prevent the connecting of the couplers and rotatable means to project at will each of the anti-coupling means into position to prevent the connecting of the couplers.

5. The combination with a pair of counterpart car couplers of means on each coupler operable to prevent the connecting of couplers and rotatable means to project either of the anti-coupling means, at will, into position to prevent the connecting of the couplers.

6. The combination with a pair of co-operating car couplers of cam operated means on one coupler to engage like means on the other coupler to prevent the connecting of the couplers at will.

7. The combination with a car coupler provided with a body member and means to interlock with means on a counterpart coupler for the purpose of connecting the couplers, of anti-coupling means operable, at will, to prevent the coupling of the interlocking means and means to move the anti-coupling means into or out of an operative position.

8. A coupling mechanism comprising a body member and means to interlock with means on a co-operating coupler for the purpose of connecting the couplers, and means capable of being projected from the face of the body member to engage the co-operating coupler to prevent the connecting of the interlocking means.

9. A coupling mechanism comprising a body member and means to interlock with means on a co-operating coupler for the purpose of connecting the couplers, means capable of being projected from the face of the body member to engage the co-operating coupler to prevent the connecting of the interlocking means and operating means mounted on the coupler and having a cam for engaging one face of the projecting means for advancing the projecting means to engage the co-operating coupler when the position of the cam face on the operating means is changed.

10. A coupling mechanism comprising a body member and means to interlock with means on a co-operating coupler for the purpose of connecting the couplers, movable means capable of being interposed between the faces of the co-operating couplers to prevent the connecting of the interlocking means and means on the coupler engaging the movable means to move said means into position between the couplers prior to attempting coupling couplers for the purpose described.

11. A coupling mechanism comprising a body member and connecting means to interlock with connecting means on a co-operating coupler for the purpose of connecting the couplers, means on the body member to prevent interlocking of the connecting means comprising a means movable longitudinally of the body and capable of being projected from the coupling face of the body member to engage the co-operating coupler, means pivotally mounted on the body member and provided with a cam face engaging the longitudinally-movable-means, means to move the pivotally mounted means about its pivotal point and simultaneously project the longitudinally-movable-means and means to retract the longitudinally-movable-means while the pivotally mounted means is returned to its prior position.

12. A coupling mechanism comprising a body member and connecting means to interlock with connecting means on a co-operating coupler for the purpose of connecting the couplers, a pin passing through and projecting from the face of the body member and having the connecting means secured thereto, mechanism mounted on the projecting end of the pin to rotate thereon, a pin mounted on the body member to move longitudinally, and means on the mechanism engaging the movable pin to advance and retract the movable pin when the said mechanism is rotated for the purpose described.

13. A coupling mechanism comprising a body member and connecting means to interlock with connecting means on a co-operating coupler for the purpose of connecting the couplers, a pin passing through and projecting from the face of the body member and having the connecting means secured thereto, mechanism mounted on the projecting end of the pin to rotate thereon, a pin mounted on the body member to move longitudinally, means on the mechanism engaging the movable pin to advance and retract the movable pin when the said mechanism is rotated for the purpose described, and means to rotate the said mechanism.

14. A coupling mechanism comprising a hollow body member and connecting means to interlock with connecting means on a cooperating coupler for the purpose of connecting the couplers, a pin passing transversely through the body member and projecting from both faces of the body member and having the connecting means secured thereto, mechanism rotatably mounted on the projecting ends of the pin, longitudinally movable means mounted on two opposite faces of the body member and means on mechanism engaging the longitudinally movable means to advance and retract said movable means when the movable means is rotated for the purpose described.

15. A coupling mechanism comprising a hollow body member and connecting means to interlock with connecting means on a cooperating coupler for the purpose of connecting the couplers, a pin passing transversely through the body member and projecting from both faces of the body member and having the connecting means secured thereto, mechanism rotatably mounted on the projecting ends of the pin, longitudinally movable means mounted on two opposite faces of the body member, means on mechanism engaging the longitudinally movable means to advance and retract said movable means when the movable means is rotated for the purpose described, and means to rotate said mechanism.

16. The combination with a pair of car couplers capable of being coupled together of movable means projecting beyond the face of one coupler to prevent the other coupler being moved into coupling relation with the first coupler.

17. The combination with a pair of car couplers capable of being coupled together, of means to be interposed between the couplers to prevent coupling and means to move said first means, at will, into said interposed position.

In testimony whereof I affix my signature.

ERNST LARSSON.